United States Patent
Nishiwaki et al.

(10) Patent No.: US 6,408,236 B2
(45) Date of Patent: Jun. 18, 2002

(54) AUTOMOTIVE VEHICLE STEERING CONTROL DEVICE

(75) Inventors: Takeshi Nishiwaki; Minoru Nishida, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/766,851

(22) Filed: Jan. 23, 2001

(30) Foreign Application Priority Data

Jun. 27, 2000 (JP) ........................................ 2000-192772

(51) Int. Cl.$^7$ .............................. G05D 1/00; G06F 17/00
(52) U.S. Cl. ......................... 701/41; 180/197; 180/446
(58) Field of Search ............................... 701/1, 41, 42; 180/197, 233, 404, 442, 443, 446, 6.2; 280/735; 318/52, 432, 489, 587; 74/866; 477/1

(56) References Cited

U.S. PATENT DOCUMENTS 5,991,671 A * 11/1999 Nishiwaki ..................... 701/23
6,269,897 B1 * 8/2001 Tamura et al. ............... 180/168
6,278,922 B1 * 8/2001 Nishiwaki ..................... 701/41

FOREIGN PATENT DOCUMENTS

| JP | 6-336170 | 12/1994 |
| JP | 9-128699 | 5/1997 |
| JP | 9-142327 | 6/1997 |
| JP | 9-221054 | 8/1997 |
| JP | 9-240502 | 9/1997 |

* cited by examiner

Primary Examiner—Gertrude Arthur
(74) Attorney, Agent, or Firm—Sughrue Mion, PLLC

(57) ABSTRACT

An image sensor for detecting a positional relationship between a subject automotive vehicle and an automotive vehicle lane, a target steering quantity calculating process for obtaining a target steering quantity A required for the automotive vehicle to run along the automotive vehicle lane based on the positional relationship, a torque sensor for detecting a manual steering force with which a driver operates a steering handle, a target steering quantity changing process for outputting a target steering quantity B by changing the target steering quantity A based on the manual steering force thus detected, a steering angle sensor for detecting an actual steering quantity, and an automatic steering force calculating process for obtaining an automatic steering force required to make the target steering quantity B and the actual steering quantity coincident with each other are provided. Even during the automatic steering, steering can be carried out based on the driver's intention.

10 Claims, 13 Drawing Sheets

AUTOMOTIVE VEHICLE STEERING CONTROL DEVICE

BACKGROUND OF THE INVENTION

1. Field of the Invention

The present invention relates to an automotive vehicle steering control device, which modifies a target steering quantity depending on a manual steering force by the driver's operation, to conduct the steering based on the driver's intention even under an automatic steering control.

2. Description of the Related Art

Various attempts have been made to superimpose the automatic steering operation and the driver's steering operation to improve a so-called automatic vehicle steering system which allows at least some part of the steering operation to be automated during running of the automotive vehicle.

Japanese Patent Application Laid-open No. 9-128699 discloses an automotive vehicle steering angle correcting device, which is provided with a drive device between a steering wheel grip portion that is operated by a driver and a directing device, and which generates such a drive output as to obtain a steering quantity required for maintaining a vehicle running lane, thereby enabling the driver's over-ride under the automatic steering control.

Japanese Patent Application Laid-open No. 9-221054 discloses an automotive vehicle steering device in which an actuator for driving a directing device to follow the vehicle running lane is provided to conduct the lane maintaining control. The steering device serves to increase or decrease a torque generated between the directing device and the steering operated by a driver depending on a difference between an angle of the directing device and an angle of the steering operated by the driver, inform the driver of the angular difference between the target steering angle and the angle of the steering operated by the driver, and provide a function to adjust the running course in the lane depending on the difference. This permits the driver to conduct the over-ride with a natural feeling.

Japanese Patent Application Laid-open Nos. 9-240502, 9-142327, 6-336170, and so on disclose an automotive vehicle steering device, which detects the driver's over-ride based on the magnitude of the driver's steering force, the quantity of change in the steering force, the steering speed and so on, and automatically switch over to the manual driving mode when the driver's over-ride is conducted during the automatic driving mode.

The automotive vehicle steering devices, which are designed to permit the driver's over-ride as mentioned above, makes it possible to conduct the emergence escaping operation when a danger is judged by the driver, for instance, when an obstructive object on the lane is found during running. Under the current technology, it is, however, difficult to conduct the emergency escaping operation automatically and surely, and therefore, such a system is desirable where man can drive the automotive vehicle with initiative at least when the emergency escape is conducted.

Further, in a system which permits the driver to switch the driving initiative from the automatic steering to the driver at the time of the emergency escaping operation as mentioned above, the switching of the driving initiative is carried out concurrently when the driver performs the emergency escaping operation. Therefore, it is desirable that the torque applied for the purpose of conducting the automatic steering at the time of the switching of the initiative does not hinder the driver's operation.

More specifically, it is desirable that means provided to conduct the automatic steering, such as a steering actuator, neither acts in contradiction to the driver's operation nor adversely affects the driver's feeling at the time of the emergency escaping operation, for example, abruptly changes the driver's steering torque, to hinder or erroneously conduct the emergency escaping operation.

In view of this, the automotive vehicle steering angle correcting device disclosed in the Japanese Patent Application Laid-open No. 9-128699 or the automotive vehicle steering device disclosed in Japanese Patent Application Laid-open No. 9-221054 can switch over to the manual steering with the operation torque maintained at the time when the driver carries out the emergency escaping operation. Accordingly, these devices do not adversely affects the driver's feeling at the time of the emergency escaping operation and do not hinder the emergency escaping operation. That is, these system (the automotive vehicle steering angle correcting device and the automotive vehicle steering device) are desirable forms that take into account such an essential factor that the emergency escaping operation be performed by the driver.

Besides, in general, a power steering device is widely used for an automotive vehicle to reduce the driver's operation force required to operate a directing device. The power steering drive is designed to actuate the directing device in the driver's operating direction depending on the driver's operation torque.

Recently, as the power steering device, a motor-driven power steering device is widely used, which has a torque sensor for detecting the driver's operation force, an electrically-driven motor for actuating the directing device, and a controller for determining and outputting a driving output and a direction of the electrically-driven motor depending on the driver's operation force detected by the torque sensor.

The motor-driven power steering device provides sufficient output power enabling a large angle steering (turning the handle with the vehicle not moving), and since the power required to steer and direct the running vehicle is generally smaller than the power required for the large angle steering, it can be used as an actuator of the automatic steering system. Assuming that the automatic steering system is incorporated in the automotive vehicle equipped with the motor-driven power steering device, the common use of the electrically-driven motor and the controller makes it possible to realize the automatic steering system with reduced cost, in comparison to a case where the separate electrically-driven motors and the separate controllers are provided.

However, each of the automotive vehicle steering angle correcting device disclosed in the Japanese Patent Application Laid-open No. 9-128699 and the automotive vehicle steering device disclosed in Japanese Patent Application Laid-open No. 9-221054 is designed such that the driving device is provided between the steering wheel grip portion operated by the driver and the directing device, and therefore, the electrically-driven motor of the power steering device, which directly drives the directing device, can not be used commonly as the driving device. For this reason, even in a case where the automatic steering system is incorporated in the vehicle having the motor-driven power steering device, it is necessary to install a dedicated electrically-driven motor and a dedicated controller, resulting in increased cost.

On the other hand, the systems which switch the driving initiative from the automatic steering to the driver in the case of emergency as disclosed such as in the Japanese Patent Application Laid-open Nos. 9-240502 and 9-142327 are each designed to drive the directing device, and therefore it is possible to commonly use the electrically-driven motor and controller of the motor-driven power steering device and thus realize the automatic steering system with reduced cost.

Although these systems are designed to switch the driving initiative from the automatic steering to the driver in the case of emergency, each of these systems interrupts the automatic steering control at the time of the switching, and therefore inevitably encounters the abrupt change of the operation torque. For these reasons, these systems adversely affect the driver's feeling at the time of the emergency escaping operation and hinder or erroneously conduct the emergency escaping operation. Accordingly, these devices cannot be considered as desirable system forms that take into account such an essential factor that the emergency escaping operation be performed by the driver.

As discussed above, no automotive vehicle steering control device (automatic steering system) is currently available, which has a drive device commonly used with a power steering device and which does not hinder the emergency escaping operation conducted by a driver.

SUMMARY OF THE INVENTION

The present invention was made in order to solve the aforementioned problems. An object of the present invention is to provide an automotive vehicle steering control device which has a drive device commonly used by a power steering device and which does not hinder the emergency escaping operation conducted by a driver.

An automotive vehicle steering control device according to a first aspect of the present invention includes: positional relationship detecting means for detecting a positional relationship between a subject automotive vehicle and an automotive vehicle lane; target steering quantity calculating means for obtaining a first-target steering quantity, required for the automotive vehicle to run along the automotive vehicle lane, based on the positional relationship; manual steering force detecting means for detecting a manual steering force with which a driver operates a steering handle; target steering quantity changing means for outputting a second target steering quantity by changing the first target steering quantity based on the manual steering force thus detected; actual steering quantity detecting means for detecting an actual steering quantity; and automatic steering force calculating means for obtaining an automatic steering force required to make the second target steering quantity and the actual steering quantity coincident with each other.

An automotive vehicle steering control device according to a second aspect of the present invention includes: positional relationship detecting means for detecting a positional relationship between a subject automotive vehicle and an automotive vehicle lane; target steering quantity calculating means for obtaining a target steering quantity, required for the automotive vehicle to run along the automotive vehicle lane, based on the positional relationship; manual steering force detecting means for detecting a manual steering force with which a driver operates a steering handle; actual steering quantity detecting means for detecting an actual steering quantity; automatic steering force calculating means for obtaining an automatic steering force required to make the target steering quantity and the actual steering quantity coincident with each other; and manual steering assisting means for superimposing the manual steering force thus detected and the automatic steering force thus obtained to each other.

An automotive vehicle steering control device according to a third aspect of the present invention, further includes: target steering quantity changing means for outputting a second target steering quantity by changing the target steering quantity based on the manual steering force thus detected, wherein the automatic steering force calculating means obtains the automatic steering force required to make the second target steering quantity and the actual steering quantity coincident with each other.

An automotive vehicle steering control device according to a fourth and a ninth aspects of the present invention, further includes: emergency escaping operation judging means for judging a driver's emergency escaping motion if the manual steering force detected by the manual steering force detecting means exceeds a threshold value preliminarily set for the manual steering force.

An automotive vehicle steering control device according to a fifth and a tenth aspects of the present invention, further includes: automatic steering force holding means for constantly holding the automatic steering force obtained by the automatic steering force calculating means if a notification indicative of the driver s emergency escaping motion is given from the emergency escaping operation judging means.

An automotive vehicle steering control device according to a sixth aspect of the present invention includes: positional relationship detecting means for detecting a positional relationship between a subject automotive vehicle and an automotive vehicle lane; target steering quantity calculating means for obtaining a first target steering quantity, required for the automotive vehicle to run along the automotive vehicle lane, based on the positional relationship; automotive vehicle speed detecting means for detecting an automotive vehicle speed of the subject automotive vehicle: manual steering force detecting means for detecting a manual steering force with which a driver operates a steering handle; target steering quantity changing means for outputting a second target steering quantity by changing the first target steering quantity based on the automotive Vehicle speed and manual steering force thus detected; actual steering quantity detecting means for detecting an actual steering quantity; automatic steering force calculating means for obtaining an automatic steering force required to make the second target steering quantity and the actual steering quantity coincident with each other; and manual steering assisting means for superimposing the manual steering force thus detected and the automatic steering force thus obtained to each other.

An automotive vehicle steering control device according to a seventh aspect of the present invention, further includes: emergency escaping operation judging means for judging a driver's emergency escaping motion if the manual steering force detected by the manual steering force detecting means exceeds a threshold value that is set based on either one of the automotive vehicle speed detected by the automotive vehicle speed detecting means and the actual steering quantity detected by the actual steering quantity detecting means.

An automotive vehicle steering control device according to an eighth aspect of the present invention, further includes: automatic steering force gradually decreasing means for gradually decreasing the automatic steering force obtained by the automatic steering force calculating means if a notification indicative of the emergency escaping motion is given from the emergency escaping operation judging means.

DESCRIPTION OF THE PREFERRED EMBODIMENTS

First Embodiment

Figure 1:
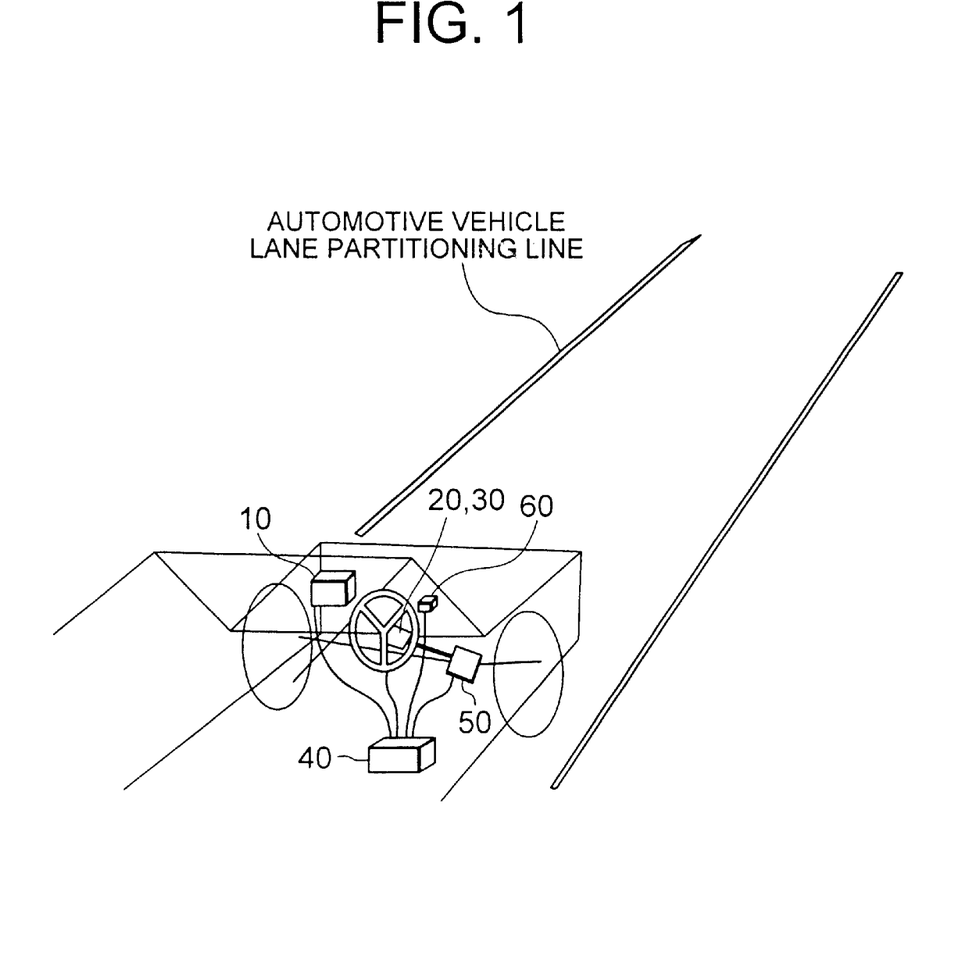
FIG. 1 shows an entire arrangement of an automotive vehicle steering control device according to a first embodiment of the present invention.
Figure 2:
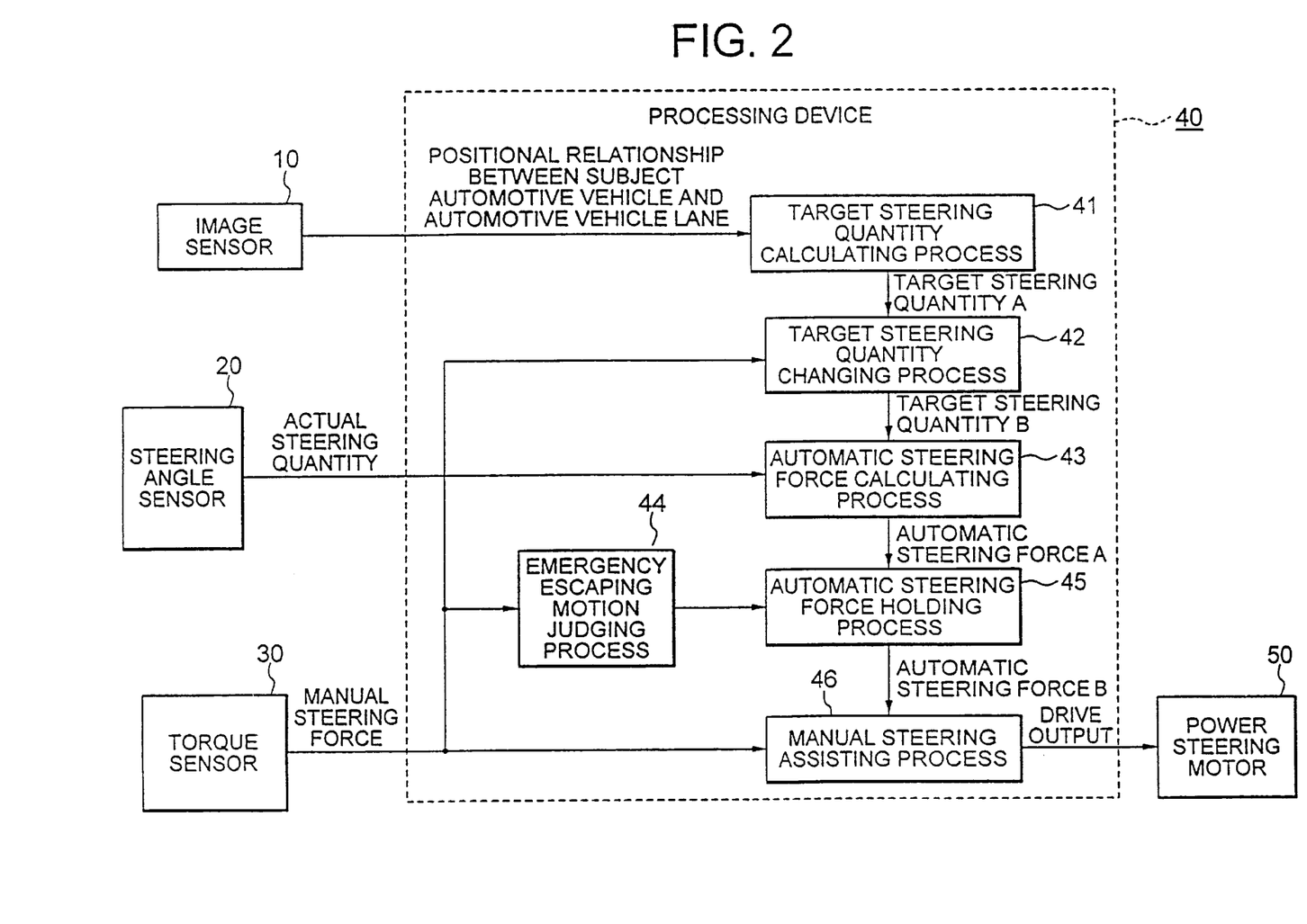
FIG. 2 is a block diagram showing an arrangement of the automotive vehicle steering control device according to the first embodiment of the present invention.

An automotive vehicle steering control device according to a first embodiment of the present invention will be described with reference to the drawings. FIG. 1 shows an entire arrangement of the automotive vehicle steering control device according to the first embodiment of the present invention. FIG. 2 is a block diagram showing an arrangement of a processing device of the automotive vehicle steering control device according to the first embodiment of the present invention. Note that, in respective drawings, the same numerals represent the same or corresponding parts.

In FIG. 1, a reference numeral 10 designates an image sensor (positional relationship detecting means) provided at a front portion or the like of an automotive vehicle, a reference numeral 20 designates a steering angle sensor (actual steering quantity detecting means) which detects an actual steering quantity (a steering angle or a steering position), a reference numeral 30 designates a torque sensor (manual steering force detecting means) which detects a manual steering force (an operation force or an operation torque) with which a driver operates a steering handle, a reference numeral 40 designates a processing device, which is a computer system, having a CPU, a memory or the like, a reference numeral 50 designates a power steering motor, and a reference numeral 60 designates an automotive vehicle speed sensor (automotive vehicle speed detecting means) built in an information panel meter. As the positional relationship detecting means, for example, a magnetic nail sensor may be used to recognize a running lane in place of the image sensor 10, or a radio wave marker or the like may be used.

In FIG. 2, the processing device 40 includes a target steering quantity calculating process (target steering quantity calculating means) 41 which obtains a target steering quantity (a steering angle or a steering position) A required for the automotive vehicle to run along a vehicle lane partitioning line, a target steering quantity changing process (target steering quantity changing means) 42 which changes the target steering quantity B in accordance with a detected manual steering force, an automatic steering force calculating process (automatic steering force calculating means) 43, which obtains an automatic steering force (a steering force or a steering torque) A that is calculated from a difference between the actual steering quantity and the target steering quantity B, an n-ordered differential value of the difference, an integral value thereof, a combination of any two of these, or all of these, and that is required to make the actual steering quantity and the target steering quantity B coincident with each other, an emergency escaping motion judging process (emergency escaping motion judging means) 44 which detects an emergency escaping operation of a driver, an automatic steering force holding process (automatic steering force holding means) 45 which holds the automatic steering force B constant if it is judged that the emergency escaping operation is being conducted by the driver, and a manual steering assisting process (manual steering assisting means) 46 which superimpose the steering force depending on the manual steering force with the automatic steering force B to output to the power steering motor 50.

Next, the operation of the automotive vehicle steering control device according to the first embodiment will be described with reference to the drawings.

Figure 3:
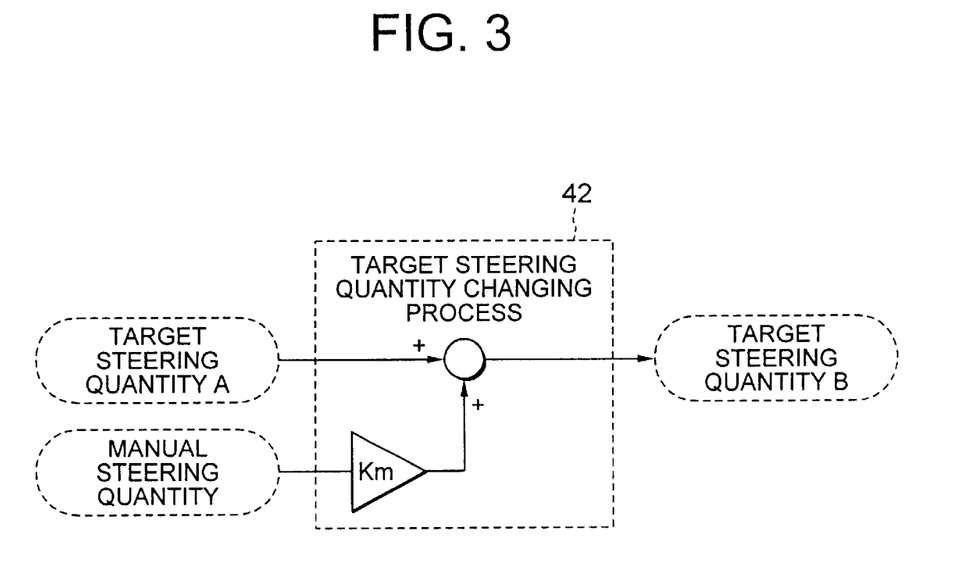
FIG. 3 shows the operation of a target steering quantity changing process in a processing device of the automotive vehicle steering control device according to the first embodiment of the present invention.

FIG. 3 shows the operation of a target steering quantity changing process in the processing device of the automotive vehicle steering control device according to the first embodiment of the present invention. In FIG. 3, a reference character Km denotes a coefficient which is set in conformity with a kinematic characteristic of the automotive vehicle.

Figure 4:
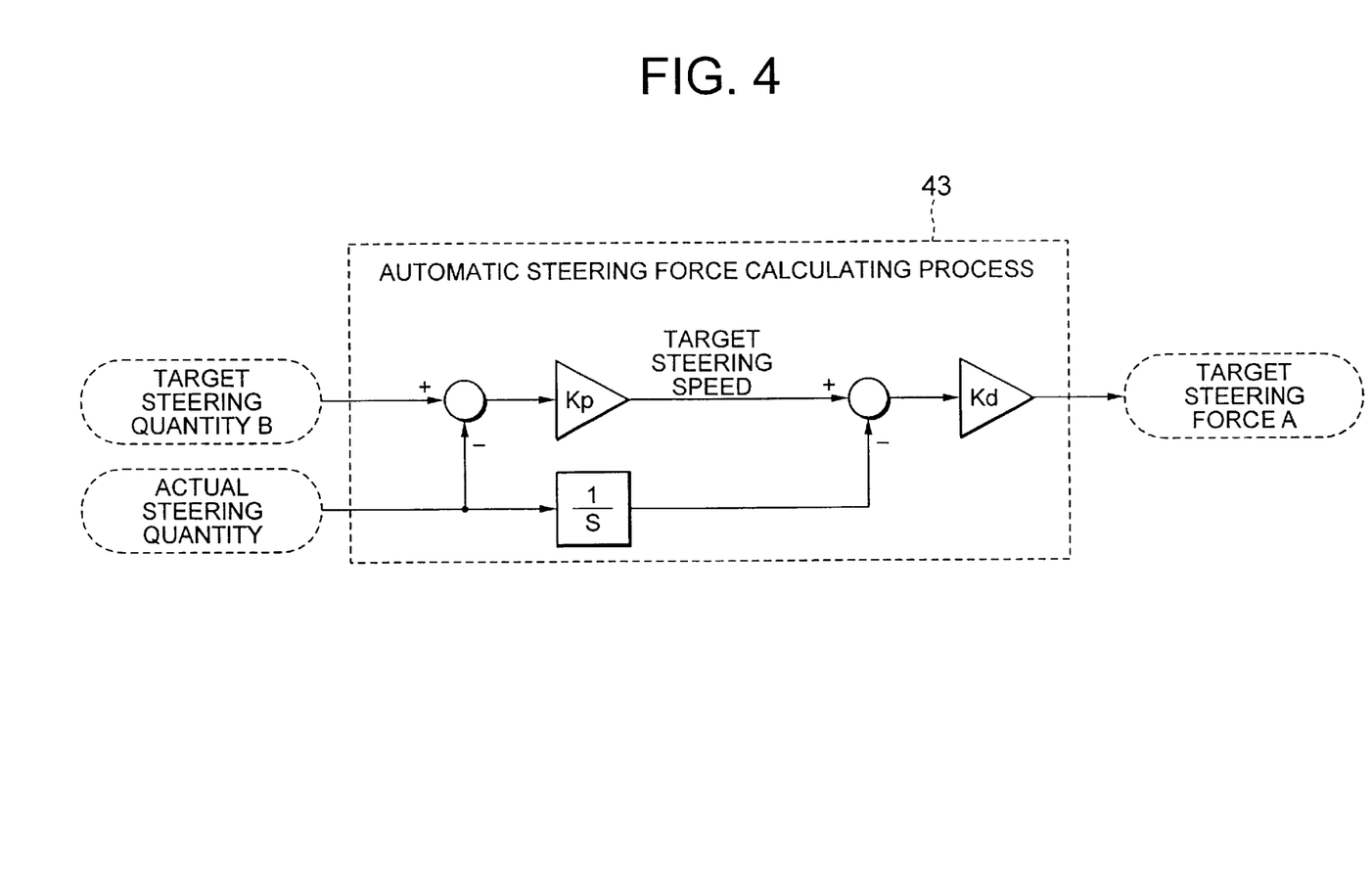
FIG. 4 shows the operation of an automatic steering force calculating process in the processing device of the automotive vehicle steering control device according to the first embodiment of the present invention.

FIG. 4 shows the operation of an automatic steering force calculating process in the processing device of the automotive vehicle steering control device according to the first embodiment of the present invention. In FIG. 4, a reference character Kp denotes a steering angle feed-back control gain and a reference character Kd denotes a steering angle speed feed-back control gain.

Figure 5:
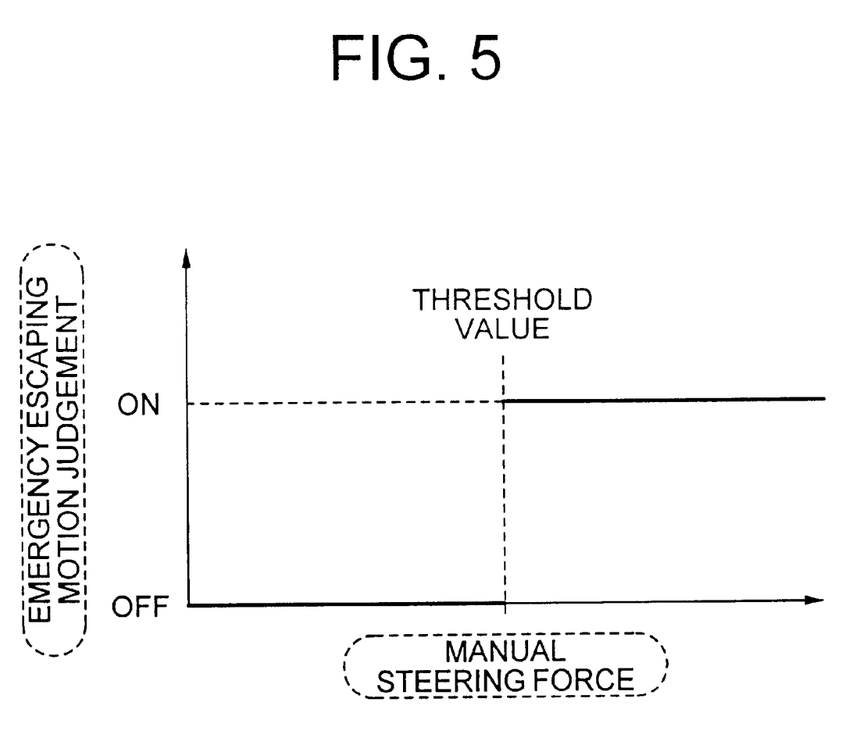
FIG. 5 shows the operation of an emergency escaping motion judging process in the processing device of the automotive vehicle steering control device according to the first embodiment of the present invention.

FIG. 5 shows the operation of an emergency escaping motion judging process in the processing device of the automotive vehicle steering control device according to the first embodiment of the present invention.

Figure 6:
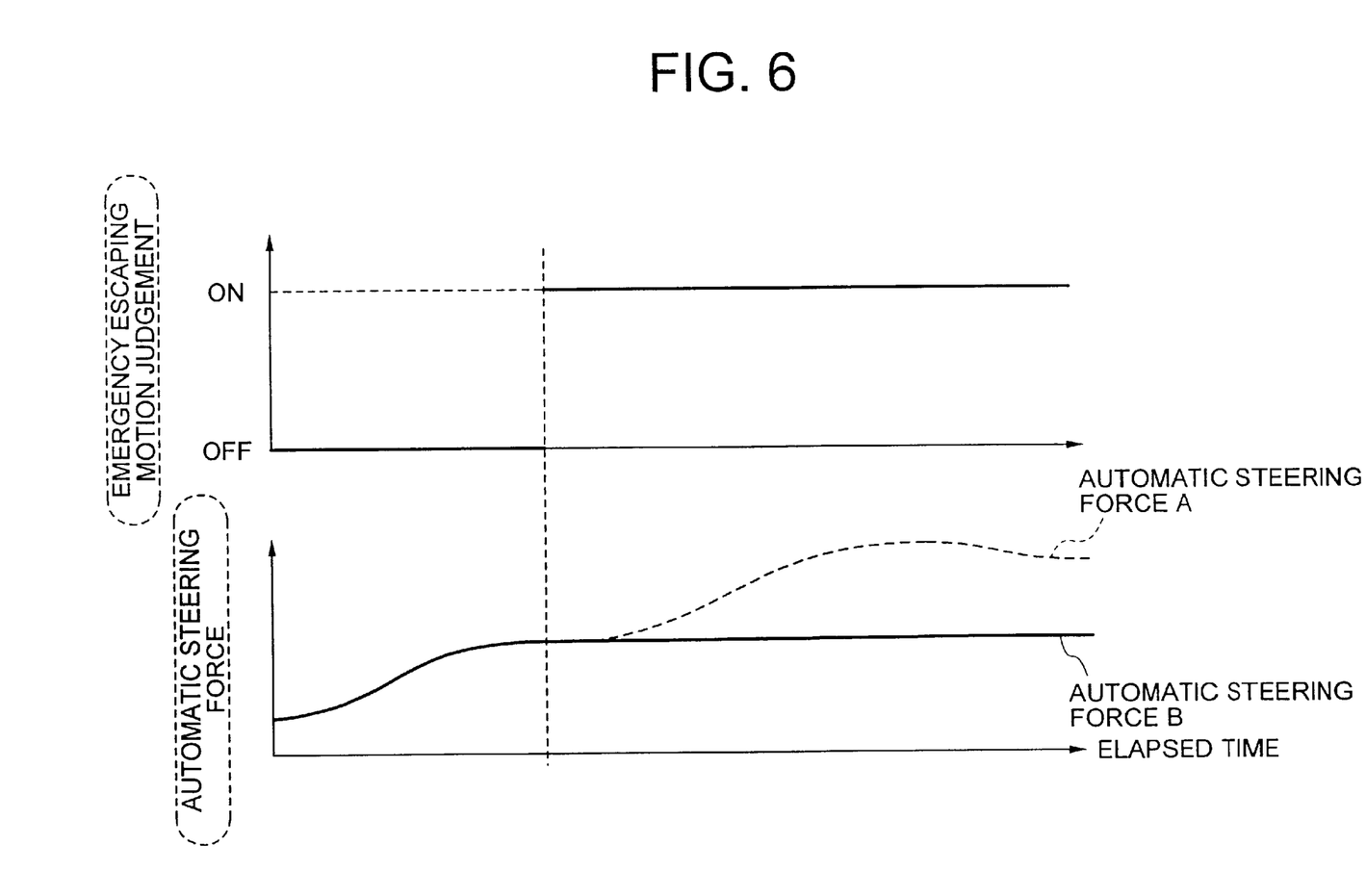
FIG. 6 shows the operation of an automatic steering force holding process in the processing device of the automotive vehicle steering control device according to the first embodiment of the present invention.

FIG. 6 shows the operation of an automatic steering force holding process in the processing device of the automotive vehicle steering control device according to the first embodiment of the present invention.

Figure 7:
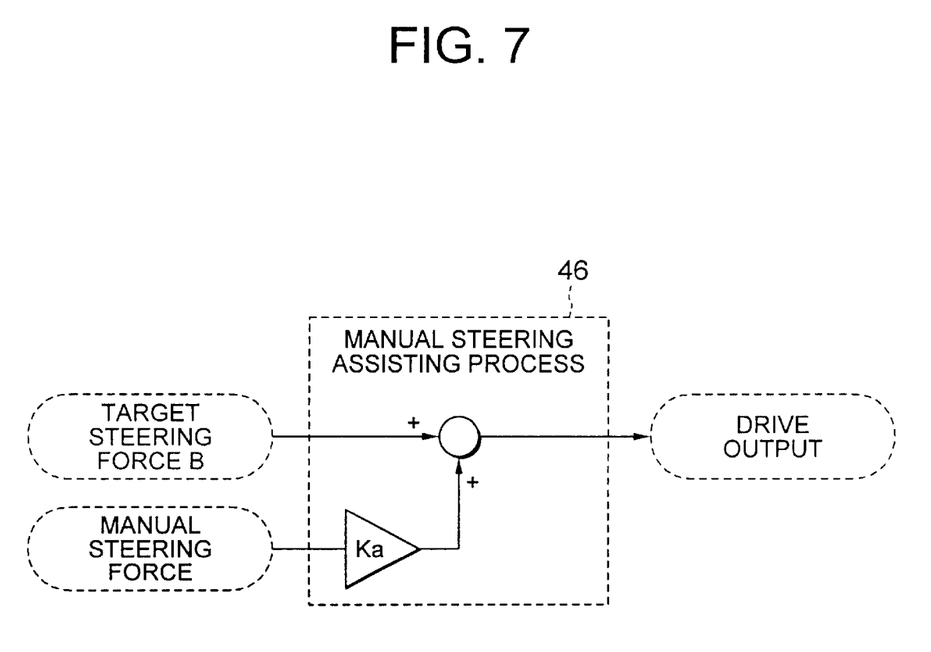
FIG. 7 shows the operation of a manual steering assisting process in the processing device of the automotive vehicle steering control device according to the first embodiment of the present invention.

FIG. 7 shows the operation of a manual steering assisting process in the processing device of the automotive vehicle steering control device according to the first embodiment of the present invention. In FIG. 7, a reference character Ka denotes a steering operation assist gain.

First of all, the target steering quantity calculating process 41 in the processing device 40 calculates a steering angle, required for an automotive vehicle to run along a vehicle lane, based on a positional relationship between the subject automotive vehicle and the vehicle lane, which is recognized by detecting a position, shape or the like of an vehicle lane partitioning line, and outputs the thus calculated steering angle as the target steering quantity A.

Next, as shown in FIG. 3, the target steering quantity changing process 42 in the processing device 40 adds, to the target steering quantity A, a value obtained by multiplying the coefficient Km by a value of the manual steering force inputted through the torque sensor 30 to the processing device 40, and outputs the result as the target steering quantity B.

Next, as shown in FIG. 4, the automatic steering force calculating process 43 in the processing device 40 sets, as the target steering speed, a value obtained by multiplying the gain Kp by a difference between the actual steering quantity from the steering angle sensor 20 and the target steering quantity B, and outputs as the automatic steering force A, a value obtained by multiplying the gain Kd by a difference between a differential value of the actual steering quantity and a differential value of the target steering speed. This process is a feed-back control having the speed feed-back in the minus loop.

Next, as shown in FIG. 5, the emergency escaping motion judging process 44 in the process device 40 notifies the automatic steering force holding process 45 of the driver's emergency escaping operation if a value of the manual steering force inputted through the torque sensor 30 to the processing device 40 is larger than a threshold value that is set so as to be the same level as a force generated when the driver intentionally operates the steering handle.

Next, as shown in FIG. 6, the automatic steering force holding process 45 in the processing device 40 outputs the automatic steering force A per se as the automatic steering force B if the driver's emergency escaping operation is not notified by the emergency escaping motion judging process 44. On the other hand, if the driver's emergency escaping operation is notified, the automatic steering force holding process 45 holds the value of the automatic steering force A at the time of the start of the notification, and outputs the thus held value as the automatic steering force B.

Subsequently, as shown in FIG. 7, the manual steering assisting process 46 in the processing device 40 multiplies the gain Ka by the value of the manual steering force inputted through the torque sensor 30 to the processing device 40, and adds the result to the automatic steering force B to obtain and output a drive output to the power steering motor 50.

That is, since the automotive vehicle steering control device according to the first embodiment of the present invention is provided with the target steering quantity changing process 42 that changes the target steering quantity A depending on the manual steering force of the driver's operation, it is possible to conduct the steering based on the driver's intention even under the automatic steering control.

Since the manual steering assisting process 46 is provided, which superimposes and outputs a steering force depending on the manual steering force of the driver's operation with the automatic steering force A or B, it is possible to conduct the steering based on the driver's intention even under the automatic steering control.

Note, however, that the mere provision of the manual steering assisting process 46 will cause the change in actual steering quantity by the superimposed output of the automatic steering force A with the steering force depending on the manual steering force, and the automatic steering force A will be increased or decreased in order to correct this change. This increase or decrease in the automatic steering force A will act in a direction so as to correct a deviation of the actual steering quantity from the manual steering force and thus conflict with the manual steering force. For this reason, both the manual steering assisting process 46 and the target steering quantity changing process 42 are provided to adjust the target steering quantity A depending on the manual steering force in order to eliminate the conflict. Therefore, the automatic steering can be prevented from conflicting with the manual steering.

The provision of the manual steering assisting process 46 will cause the change in actual steering quantity by the superimposed output of the automatic steering force A with the steering force depending on the manual steering force, and the target steering quantity calculating process 41, which obtains the target steering quantity A to change the automotive vehicle posture depending on the change in the actual steering quantity, will increase or decrease the target steering quantity A in order for the automotive vehicle to run along the vehicle lane partitioning line by correcting the change of the automotive vehicle posture. Since the increase or decrease of the target steering quantity A will serve to correct the automotive vehicle posture changed by the manual steering force to return to the original posture, and thus will serve to hinder the manual steering and to conflict with the manual steering force. For this reason, the automatic steering force holding process 45 is provided in order to hold the automatic steering force B constant when the steering handle is largely operated to escape from the emergency. Accordingly, no conflict motion occurs, and there is no case where the driver's emergency escaping operation is hindered. Further, since the automatic steering force B is kept constant, the abrupt change in the operation force never occurs. Therefore, there is not case that the steering feeling is adversely affected to erroneously conduct the driver's emergency escaping operation.

Since the emergency escaping motion judging process 44 is provided, which detects the driver's emergency escaping operation based on the detected value of the torque sensor 30 that has been already used in the system, it is possible to detect the emergency escaping operation without providing a new detecting device, thereby making it possible to suppress the cost increase.

Second Embodiment

Figure 8:
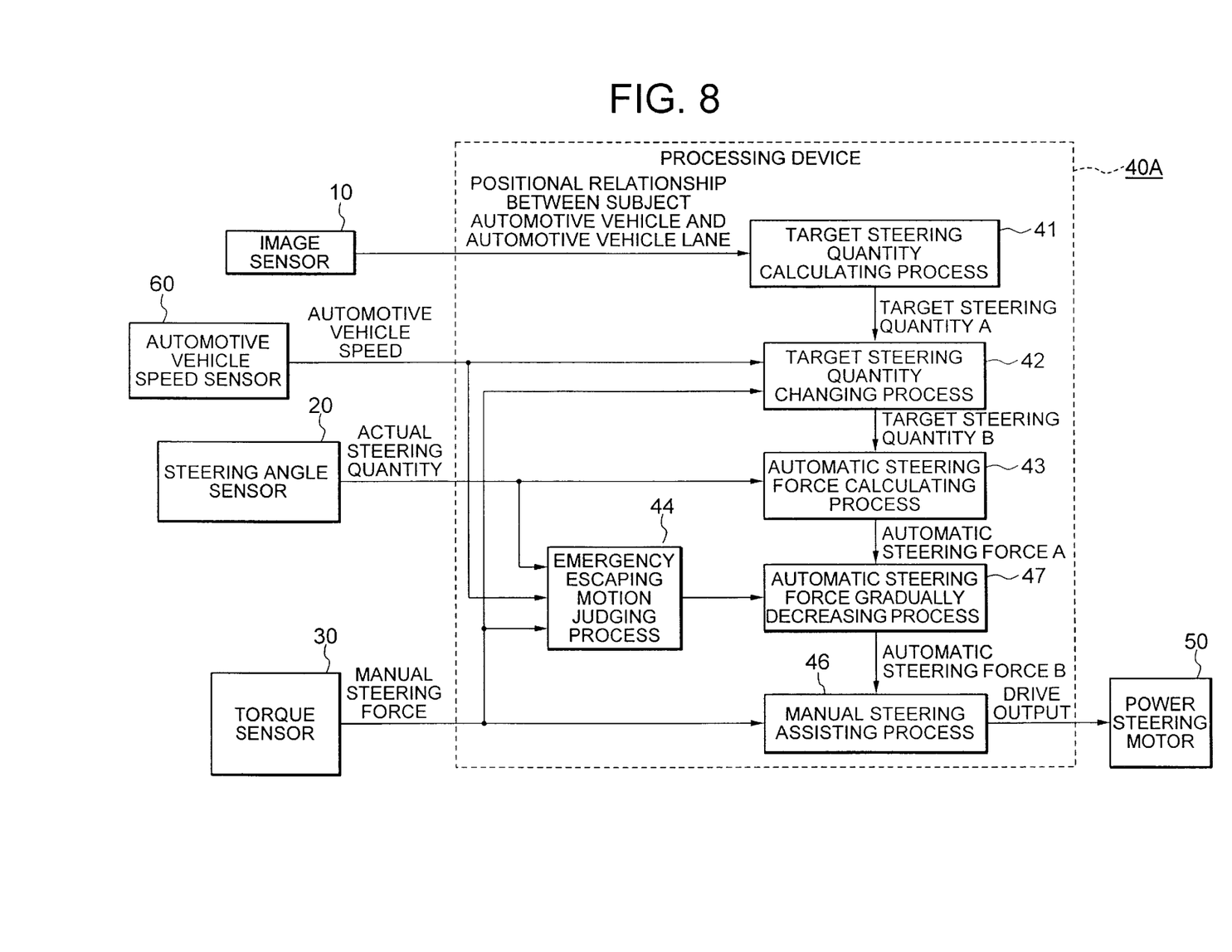
FIG. 8 is a block diagram showing an arrangement of an automotive vehicle steering control device according to the second embodiment of the present invention.

An automotive vehicle steering control device according to a second embodiment of the present invention will be described with reference to the drawings. FIG. 8 is a block diagram showing an arrangement of an automotive vehicle steering control device according to the second embodiment of the present invention. The entire arrangement of the second embodiment is similar to that of the first embodiment.

In FIG. 8, the processing device 40A includes, in place of the automatic steering force holding process 45, an automatic steering force gradually decreasing process (automatic steering force gradually decreasing means) 47 which gradually decreases the automatic steering force B when it is judged that the emergency escaping operation is conducted by the driver.

Next, the operation of the automotive vehicle steering control device according to the second embodiment will be described with reference to the drawings.

Figure 9:
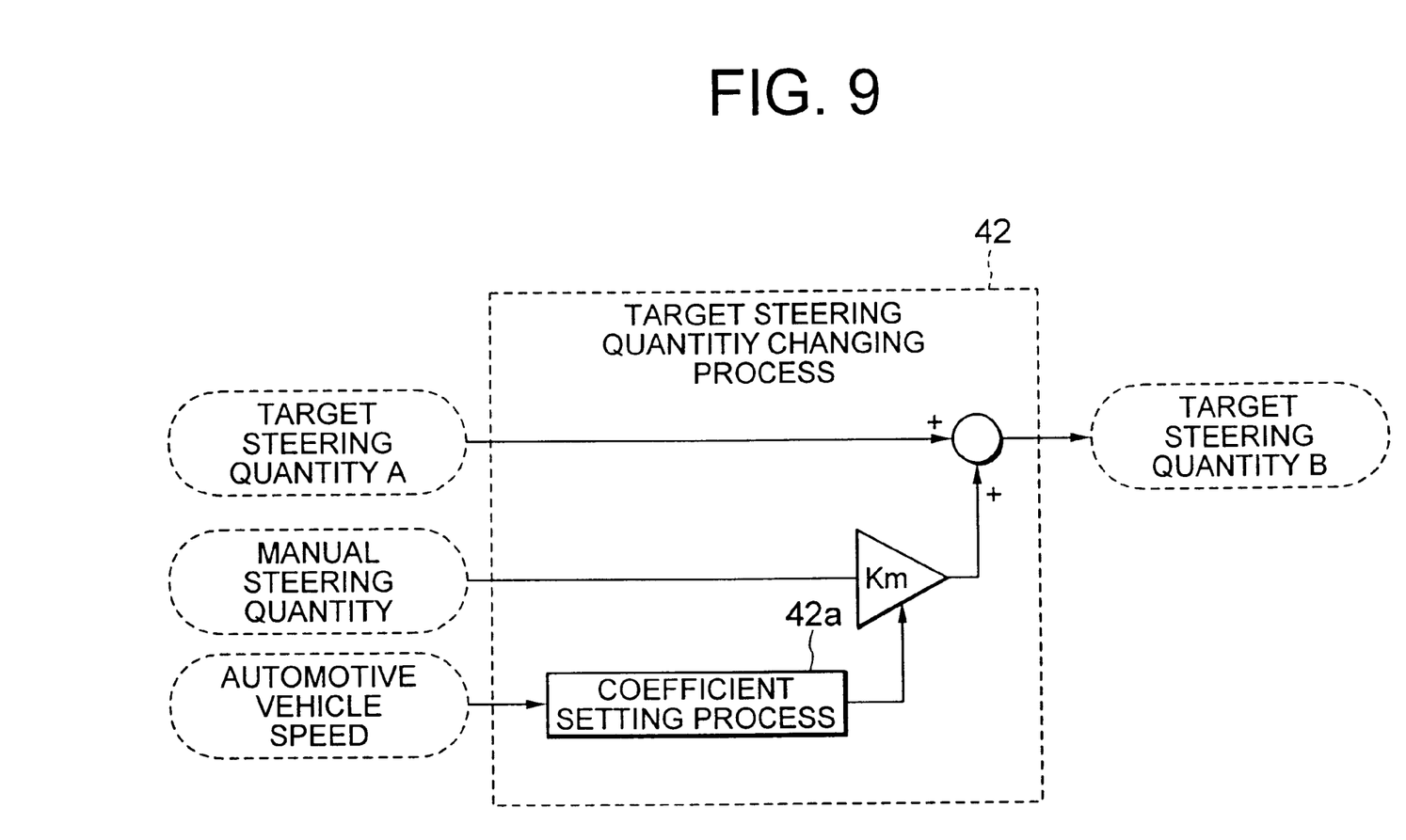
FIG. 9 shows the operation of a target steering quantity changing process in a processing device of the automotive vehicle steering control device according to the second embodiment of the present invention.

FIG. 9 shows the operation of a target steering quantity changing process in the processing device of the automotive vehicle steering control device according to the second embodiment of the present invention. In FIG. 9, a reference character Km denotes a coefficient which is set in conformity with a kinematic characteristic of the automotive vehicle. A reference numeral 42a denotes a coefficient setting process section.

Figure 10:
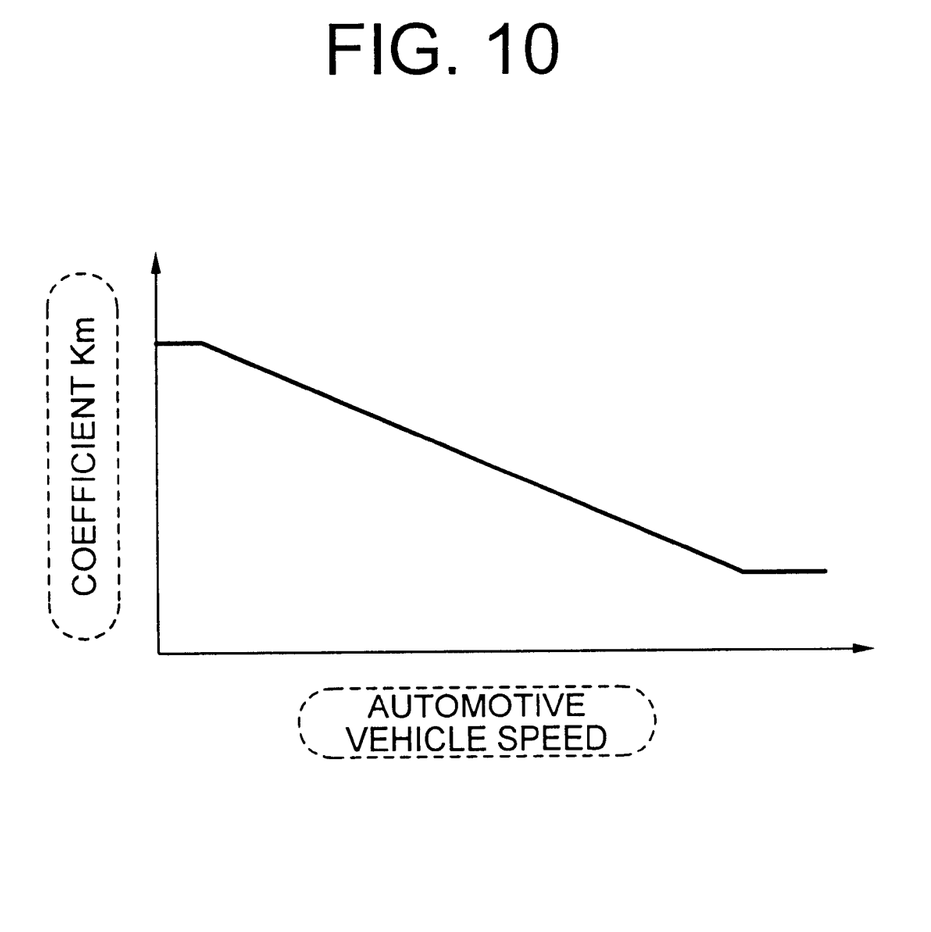
FIG. 10 shows the operation of the coefficient setting process section of the target steering quantity changing process in the processing device of the automotive vehicle steering control device according to the second embodiment of the present invention.

FIG. 10 shows the operation of the coefficient setting process section of the target steering quantity changing process in the processing device of the automotive vehicle steering control device according to the second embodiment of the present invention.

Figure 11:
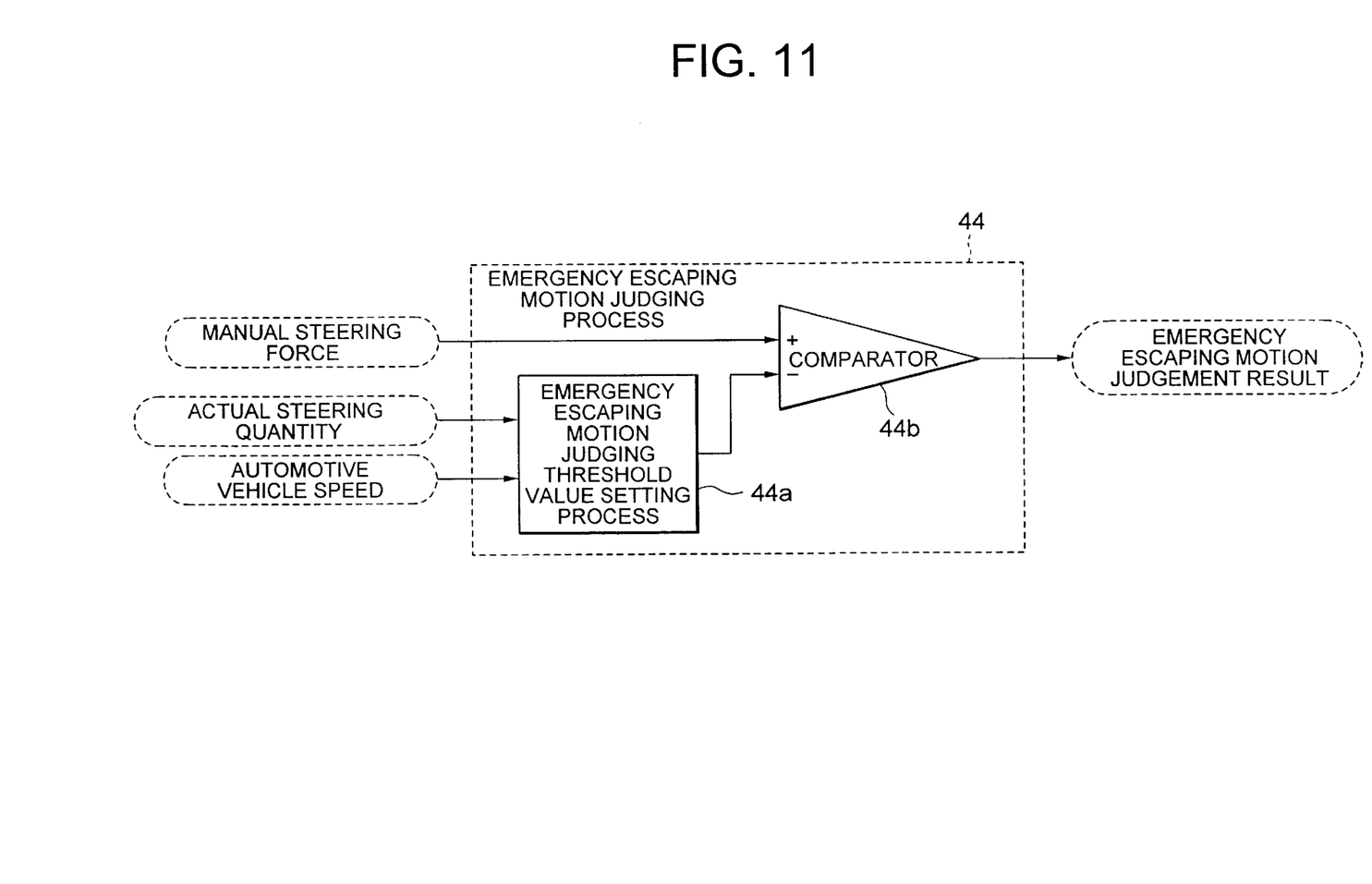
FIG. 11 shows the operation of an emergency escaping motion judging process in the processing device of the automotive vehicle steering control device according to the second embodiment of the present invention.

FIG. 11 shows the operation of an emergency escaping motion judging process in the processing device of the automotive vehicle steering control device according to the second embodiment of the present invention. In FIG. 11, a reference numeral 44a denotes an emergency escaping motion judging threshold value setting process, and a reference numeral 44b denotes a comparator.

Figure 12:
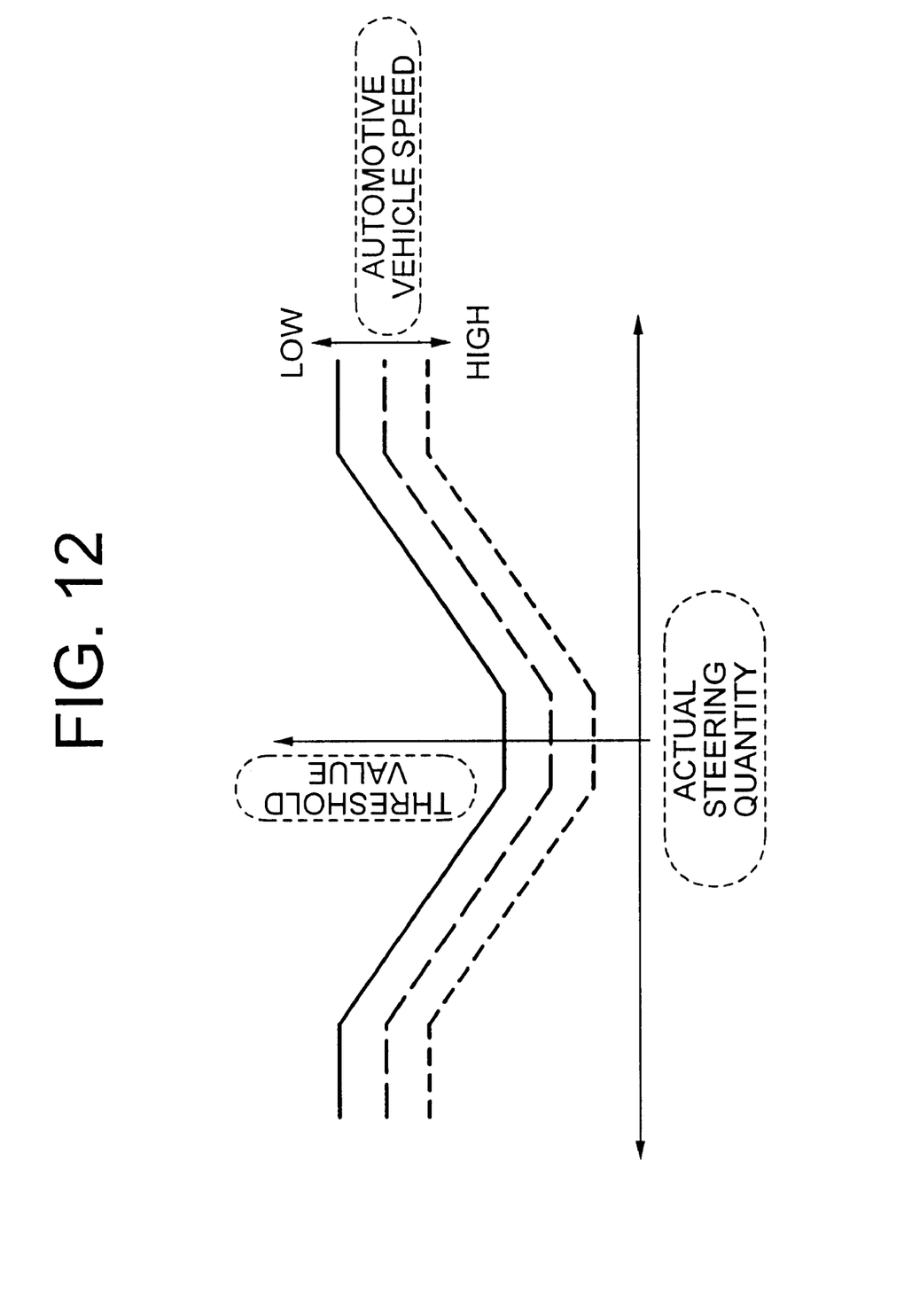
FIG. 12 shows the operation of the emergency escaping motion judging threshold value setting process of the emergency escaping motion judging process in the processing device of the automotive vehicle steering control device according to the second embodiment of the present invention.

FIG. 12 shows the operation of the emergency escaping motion judging threshold value setting process of the emergency escaping motion judging process in the processing device of the automotive vehicle steering control device according to the second embodiment of the present invention.

Figure 13:
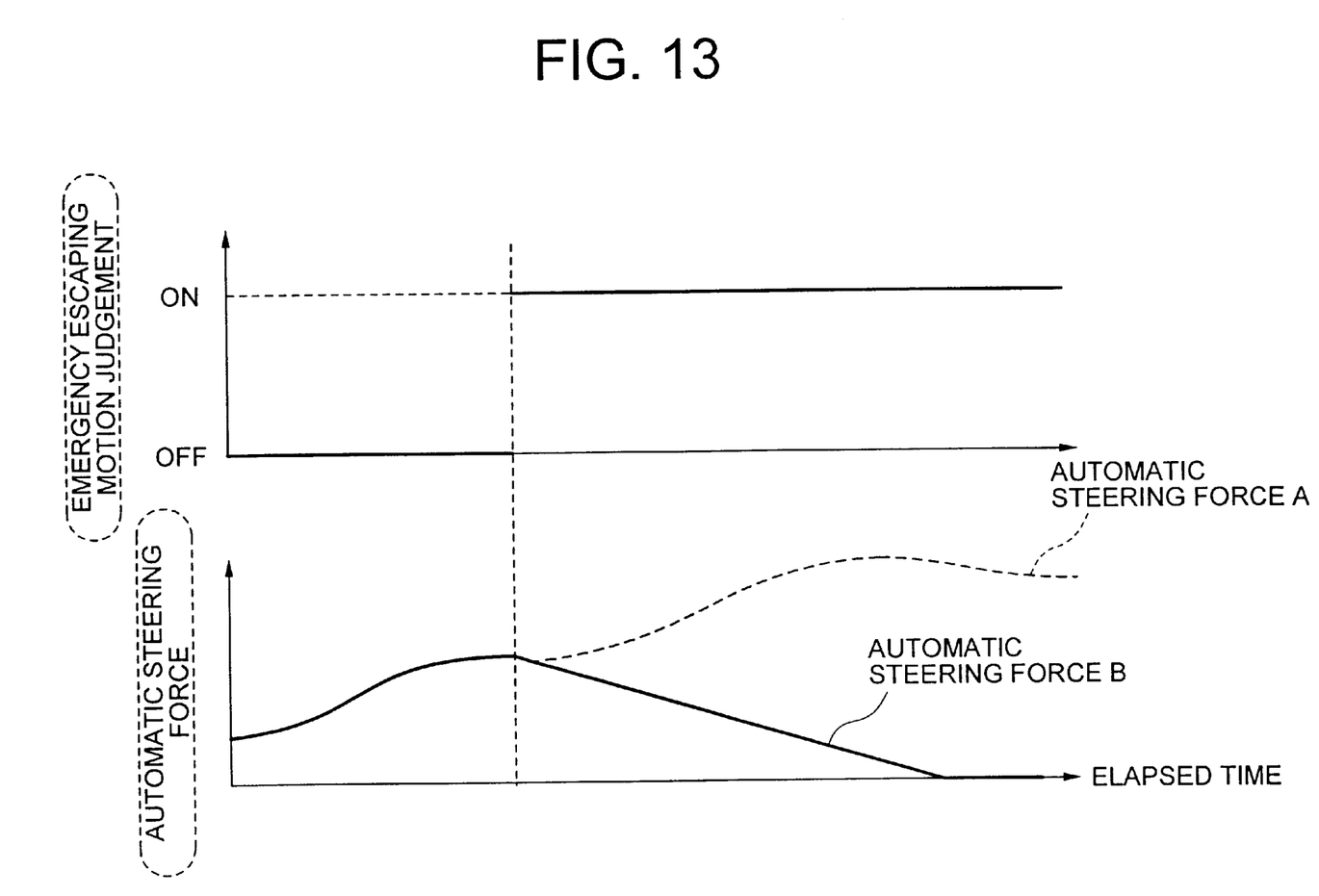
FIG. 13 shows the operation of an automatic steering force gradually decreasing process in the processing device of the automotive vehicle steering control device according to the second embodiment of the present invention.

FIG. 13 shows the operation of an automatic steering force gradually decreasing process in the processing device of the automotive vehicle steering control device according to the second embodiment of the present invention.

The second embodiment differs from the first embodiment in operation of the target steering quantity process 42 and the emergency escaping motion judging process 44, and in that the automatic steering force holding process 45 is replaced with the automatic steering force gradually decreasing process 47. The operation associated with different points from the first embodiment will be described in the following paragraphs.

The processing device 40A differs from the processing device 40 of the first embodiment in that in the target steering quantity process 42, as shown in FIG. 9, the coefficient setting process section 42a is provided to variably change the coefficient depending on the automotive vehicle speed detected by the automotive vehicle speed sensor 60. As shown in FIG. 10, the coefficient setting process section 42a is designed to set the coefficient Km, which is to be multiplied to the value of the manual steering force inputted through the torque sensor 30, to be large as the automotive vehicle speed is low, and low as the automotive vehicle speed is high.

The processing device 40A differs from the processing device 40 of the first embodiment in that, as shown in FIG. 11 in the emergency escaping motion judging process 44, the emergency escaping motion judging threshold value setting process 44a is provided, which variably changes the judging threshold value depending on the automotive vehicle speed and the actual steering quantity. As shown in FIG. 12, the emergency escaping motion judging threshold value setting process 44a sets the threshold value for judgement of the emergency escaping motion to be large as the automotive vehicle speed is low, small as the automotive vehicle speed is high, large as the actual steering quantity is large and small as the actual steering quantity is small.

As shown in FIG. 13, the automatic steering force gradually decreasing process 47 in the processing device 40A outputs the automatic steering force A per se as the automatic steering force B if the driver's emergency escaping motion is not notified by the emergency escaping motion judging process 44. If the emergency escaping motion is notified, the automatic steering force gradually decreasing process 47 outputs, as the automatic steering force B, a value that is obtained by gradually decreasing the automatic steering force A at the time of the start of the notification depending on the elapsed time period from the time point of the start of the notification.

That is, since the automotive vehicle steering control device according to the second embodiment is provided in place of the automatic steering force holding process 45 holding the automatic steering force constant, with the automatic steering force gradually decreasing process 47 which gradually decreases the automatic steering force, it is possible to suppress the effect of the automatic steering force to the driver while maintaining the function of avoiding the abrupt change of the operation force as explained in the first embodiment.

In order to detect and judge the driver's emergency escaping operation based on the manual steering force detected by the torque sensor 30, the emergency escaping motion judging process 44 is provided which takes into account the automotive vehicle speed detected by the automotive vehicle speed sensor 60 and the actual steering quantity detected by the steering angle sensor 20, and therefore the accuracy of the judgement can be enhanced.

Since the target steering quantity changing process 42 is provided to adjust the relationship between the manual steering force and the change of the target steering quantity depending on the automotive vehicle speed, it is possible to conduct the emergency escaping operation with a more natural feeling.

What is claimed is:

1. An automotive vehicle steering control device comprising:

positional relationship detecting means for detecting a positional relationship between a subject automotive vehicle and an automotive vehicle lane;

target steering quantity calculating means for obtaining a first target steering quantity, required for the automotive vehicle to run along the automotive vehicle lane, based on the positional relationship;

manual steering force detecting means for detecting a manual steering force with which a driver operates a steering handle;

target steering quantity changing means for outputting a second target steering quantity by changing the first target steering quantity based on the manual steering force thus detected;

actual steering quantity detecting means for detecting an actual steering quantity; and automatic steering force calculating means for obtaining an automatic steering force required to make the second target steering quantity and the actual steering quantity coincident with each other.

2. An automotive vehicle steering control device comprising:

positional relationship detecting means for detecting a positional relationship between a subject automotive vehicle and an automotive vehicle lane;

target steering quantity calculating means for obtaining a target steering quantity, required for the automotive vehicle to run along the automotive vehicle lane, based on the positional relationship;

manual steering force detecting means for detecting a manual steering force with which a driver operates a steering handle;

actual steering quantity detecting means for detecting an actual steering quantity;

automatic steering force calculating means for obtaining an automatic steering force required to make the target steering quantity and the actual steering quantity coincident with each other; and manual steering assisting means for superimposing the manual steering force thus detected and the automatic steering force thus obtained to each other.

3. The automotive vehicle steering control device as claimed in claim 2, further comprising:

target steering quantity changing means for outputting a second target steering quantity by changing the target steering quantity based on the manual steering force thus detected, wherein the automatic steering force calculating means obtains the automatic steering force required to make the second target steering quantity and the actual steering quantity coincident with each other.

4. The automotive vehicle steering control device as claimed in claim 3, further comprising:

emergency escaping operation judging means for judging a driver's emergency escaping motion if the manual steering force detected by the manual steering force detecting means exceeds a threshold value preliminarily set for the manual steering force.

5. The automotive vehicle steering control device as claimed in claim 4, further comprising:

automatic steering force holding means for constantly holding the automatic steering force obtained by the automatic steering force calculating means if a notification indicative of the driver's emergency escaping motion is given from the emergency escaping operation judging means.

6. The automotive vehicle steering control device as claimed in claim 2, further comprising:

emergency escaping operation judging means for judging a driver's emergency escaping motion if the manual steering force detected by the manual steering force detecting means exceeds a threshold value preliminarily set for the manual steering force.

7. The automotive vehicle steering control device as claimed in claim 6, further comprising:

automatic steering force holding means for constantly holding the automatic steering force obtained by the automatic steering force calculating means if a notification indicative of the driver's emergency escaping motion is given from the emergency escaping operation judging means.

8. An automotive vehicle steering control device comprising:

positional relationship detecting means for detecting a positional relationship between a subject automotive vehicle and an automotive vehicle lane;

target steering quantity calculating means for obtaining a first target steering quantity, required for the automotive vehicle to run along the automotive vehicle lane, based on the positional relationship;

automotive vehicle speed detecting means for detecting an automotive vehicle speed of the subject automotive vehicle:

manual steering force detecting means for detecting a manual steering force with which a driver operates a steering handle;

target steering quantity changing means for outputting a second target steering quantity by changing the first target steering quantity based on the automotive vehicle speed and manual steering force thus detected;

actual steering quantity detecting means for detecting an actual steering quantity;

automatic steering force calculating means for obtaining an automatic steering force required to make the second target steering quantity and the actual steering quantity coincident with each other; and manual steering assisting means for superimposing the manual steering force thus detected and the automatic steering force thus obtained to each other.

9. The automotive vehicle steering control device as claimed in claim 8, further comprising:

emergency escaping operation judging means for judging a driver's emergency escaping motion if the manual steering force detected by the manual steering force detecting means exceeds a threshold value that is set based on either one of the automotive vehicle speed detected by the automotive vehicle speed detecting means and the actual steering quantity detected by the actual steering quantity detecting means.

10. The automotive vehicle steering control device as claimed in claim 9, further comprising:

automatic steering force gradually decreasing means for gradually decreasing the automatic steering force obtained by the automatic steering force calculating means if a notification indicative of the driver's emergency escaping motion is given from the emergency escaping operation judging means.

* * * * *